United States Patent
Crawford et al.

(10) Patent No.: US 9,875,046 B2
(45) Date of Patent: *Jan. 23, 2018

(54) TAPE BACKUP AND RESTORE IN A DISK STORAGE ENVIRONMENT WITH INTELLIGENT DATA PLACEMENT

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/298,681

(22) Filed: Oct. 20, 2016

(65) Prior Publication Data
US 2017/0038986 A1 Feb. 9, 2017

Related U.S. Application Data (63) Continuation of application No. 14/481,049, filed on Sep. 9, 2014.

(51) Int. Cl.
*G06F 3/06* (2006.01)

(52) U.S. Cl.
CPC .......... *G06F 3/0619* (2013.01); *G06F 3/0647* (2013.01); *G06F 3/0665* (2013.01); *G06F 3/0682* (2013.01); *G06F 3/0685* (2013.01); *G06F 3/0686* (2013.01); *G06F 2212/213* (2013.01)

(58) Field of Classification Search
CPC ...... G06F 3/0619; G06F 3/065; G06F 3/0647; G06F 3/0682
USPC ........................................................ 711/162
See application file for complete search history.

(56) References Cited

U.S. PATENT DOCUMENTS

| | | | |
|---|---|---|---|
| 6,269,431 B1 | 7/2001 | Dunham | |
| 6,957,291 B2 | 10/2005 | Moon | |
| 7,734,884 B1 | 6/2010 | Marshak et al. | |
| 8,676,763 B2 | 3/2014 | Goodman et al. | |
| 9,032,144 B2 | 5/2015 | Muroyama | |
| 9,087,014 B1 | 7/2015 | Jennas, II et al. | |
| 9,116,853 B1 | 8/2015 | Jennas, II et al. | |
| 2007/0161215 A1 | 7/2007 | Kaiya et al. | |
| 2012/0005154 A1 | 1/2012 | George et al. | |

(Continued)

OTHER PUBLICATIONS

Green et al., "Designing a Fast, On-line Backup System for a Log-Structured File System," Digital Technical Journal, vol. 8, No. 2, 1996, pp. 32-45.

(Continued)

*Primary Examiner* — Jasmine Song
(74) *Attorney, Agent, or Firm* — Scott S. Dobson (57) ABSTRACT

Data is relocated, based on an intelligent data placement algorithm, from a first storage location to a second storage location in a disk storage system. A data placement record is generated including a virtual disk location associated with the data, the second storage location, and a first sequence value. The first sequence value indicates relative sequence when compared to other sequence values. The data placement record is written to a first record location on a first tape cartridge loaded in a tape drive. The data placement records are used with data records to restore data to disk storage from tape backup.

11 Claims, 7 Drawing Sheets

(56) References Cited

U.S. PATENT DOCUMENTS

| | | |
|---|---|---|
| 2012/0158666 A1 | 6/2012 | Anglin et al. |
| 2013/0006943 A1 | 1/2013 | Chavda et al. |
| 2014/0040206 A1 | 2/2014 | Ramakrishnan et al. |
| 2014/0181396 A1 | 6/2014 | Vincent |
| 2016/0070487 A1 | 3/2016 | Crawford et al. |

OTHER PUBLICATIONS

List of IBM Patents or Patent Applications Treated as Related, dated Oct. 19, 2016, pp. 1-2.

| Track ID | Storage Tier | Sequence # |
|---|---|---|
| fb_0001 A | 1 | 4225 |
| fb_0001 E | 3 | 3945 |
|  |  |  |
| fb_0001 B | 2 | 1245 |
| fb_0001 C | 1 | 1246 |
| fb_0001 A | 3 | 5432 |
| fb_0001 D | 2 | 189 |
|  |  |  |

| Track ID | Storage Tier | Sequence # | Tape Cartridge | Cartridge Address | Sequence # |
|---|---|---|---|---|---|
| fb_0001 A | 3 | 4225 | AAA001 | 0x375 | 4225 |
| fb_0001 B | 2 | 3453 | AAA001 | 0x1A6 | 1245 |
| fb_0001 C | 1 | 1246 | AAA038 | 0x1A6 | 1246 |
| fb_0001 D | 2 | 2764 | AAA038 | 0x008 | 3945 |
| fb_0001 E | 3 | 3945 | ... | ... | |
| ... | | | | | |

FIG. 7

TAPE BACKUP AND RESTORE IN A DISK STORAGE ENVIRONMENT WITH INTELLIGENT DATA PLACEMENT

BACKGROUND

The present disclosure relates to computer backup storage, and more specifically, to log-structured tape backup and restore in a disk storage environment.

Tape storage is sometimes used to back up data from disk storage. Tape storage provides backup storage at a low energy cost and allows data to survive for a long period of time in an encrypted format. Users backing up disk storage to tape storage typically build a custom-offload solution that involves creating a point in time copy of the volumes to be backed up, then, using a tape manager and/or host application, copying the data from the point in time copy to the tape. This is normally done at night, and care must be taken to ensure off-load is done within a certain period of time.

SUMMARY

According to embodiments of the present disclosure, a method for tape backup in a disk storage environment with intelligent data placement is disclosed. The method includes relocating data, based on an intelligent data placement algorithm, from a first storage location to a second storage location in a disk storage system. The method further includes generating a data placement record including a virtual disk location associated with the data, the second storage location, and a sequence value. The sequence value indicates relative sequence when compared to other sequence values. The method further includes writing the data placement record to a record location on a first tape cartridge loaded in a tape drive.

Further disclosed herein are embodiments of a method for restoring data from tape backup in a disk storage system with intelligent data placement. The method includes generating a record restore table. The method further includes scanning a set of tape cartridges. Each tape cartridge contains data records and data relocation records. Each data record includes a virtual disk location, a storage location, a sequence value, and backup data. Each data relocation record includes a virtual disk location, a storage location, and a sequence value. The method further includes reading a first virtual disk location, a first storage location, and a first sequence value from a first data record at a first record location. The method further includes populating a first entry in the record restore table. The first entry includes the first virtual disk location, the first storage location, the first record location, and the first sequence value. The method further includes reading the first virtual disk location, a second storage location, and a second sequence value from a first data placement record. The method further includes determining the second sequence value is more recent than the first sequence value. The method further includes modifying the first entry in the record restore table to include the second storage location and the second sequence value.

Further disclosed herein are embodiments of a system for tape backup in a disk storage environment. The system includes a tape backup system including a plurality of tape cartridges and a disk storage system connected to the tape backup system. The disk storage system is configured to relocate data based on an intelligent data placement algorithm. The disk storage system is further configured to generate a first data placement record in response to relocating the data. The first data placement record includes a first virtual disk location associated with the data, a first storage location, and a first sequence value. The first sequence value indicates relative sequence when compared to other sequence values. The disk storage system is further configured to write the first record to a first record location on a first tape cartridge loaded in a tape drive.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to log-structured tape backup and restore in a disk storage environment with intelligent data placement. Further aspects relate to restoring data to proper storage locations using tape backup. While the present disclosure is not necessarily limited to such applications, various aspects of the disclosure may be appreciated through a discussion of various examples using this context.

Intelligent data placement algorithms relocate data on disk storage with the goal of optimizing data access. For example, intelligent data placement algorithms may relocate frequently accessed data to storage locations which are more easily accessible. Alternatively, intelligent data placement algorithms may relocate data which is rarely accessed from an easily accessible location to a less easily accessible location.

Embodiments of the present disclosure may provide for writing records indicating data location changes to tape backup in a disk storage environment with intelligent data placement. Embodiments of the present disclosure may operate in an environment where data written to a disk storage system is backed up to tape storage system by sequentially writing the data to the tape storage system using data records, without needing to index the data at specific locations on the tape cartridges. Further embodiments of the present disclosure may provide for restoring data to the disk storage system from the tape storage system with data records and data placement records.

In an example system, when a write command is received at a disk storage system, the disk storage system may write a data record containing the data, the virtual disk location, the storage location, and a sequence value to a tape cartridge while synchronously writing the data to disk. Although the example system described herein backs up data synchronously, embodiments of the present invention may also be used in any system which backs up data in a disk storage system with data records written to tape. For example, the system may back up the data to tape storage asynchronously.

The virtual disk location, storage location and sequence value may be located in a header of the data record to simplify identification during restore. The virtual disk location is a logical location that does not change when the data is physically moved to a different storage location due to intelligent data placement. The sequence values for the records indicate the sequence of the records when compared to each other. For example, the sequence value may be a number which increases sequentially for each record written to tape. Thus, a record with a higher sequence number may indicate a more recent record than a record with a lower sequence number.

The tape storage system may maintain metadata on the records. The metadata may include a tape record table for each tape cartridge with information on the current data records stored on the respective tape cartridge. In some embodiments, after writing a data record to tape storage, the disk storage system stores information on the record in the record metadata for the record location. Additionally, the disk storage system may identify information for a previous record associated with the same virtual disk location and clear the information. Clearing the information may indicate that the previous record location is free to be written to.

Additionally, after writing the record to tape storage, the tape cartridge is positioned at the next free record location. The next free record location may be determined by referencing the metadata. If the tape cartridge is full, a different tape cartridge may be loaded into the tape drive for positioning at the next free record location. The record metadata may be referenced to identify a tape cartridge with the most free record locations in determining which tape cartridge to load into the tape drive.

In a system such as the one described herein, data placement records are created and written to the tape backup storage for data placement changes made by an intelligent data placement algorithm. These data placement records may also be used in any system which backs up data to tape using data records, such as an asynchronous system. Data placement records may contain the virtual disk location, the storage location, and a sequence number. The structure of the data placement records may be the same as the data records; however, the data placement records are not required to contain the backup data.

Data may be restored from the tape storage using the data records and data placement records stored on the tape storage. The tape cartridges may be scanned and virtual disk locations, storage locations, and sequence numbers for each record may be read. This information may be located in a header for each record. A record restore table may be generated and populated with information read from the tape cartridges. In some embodiments, the record restore table includes, for each virtual disk location, the storage location, the record location, and a sequence value. For each record, the record restore table may be populated for the virtual disk location if there is no populated information for the virtual disk location. If the record restore table is already populated for a given virtual disk location, the table may be updated based on the new record if the sequence number for the new record indicates a more recent record when compared to the sequence number in the table. For a data record, this may include updating the record location and sequence number. For a data placement record, this may include updating the storage location. If the sequence value indicates an older record, the record may be ignored. This process may continue until all of the records are scanned through.

The completed record restore table may indicate the most current data record location for each virtual disk location and the storage location where it was last located. This information may be used to restore data from the tape cartridges to disk storage at the correct storage locations. In some embodiments, a user may be presented with a list of virtual disk locations which are available to be restored. The user may select a set of virtual disk locations and the set of virtual disk locations may be restored from the tape cartridges using the record restore table.

Figure 1:
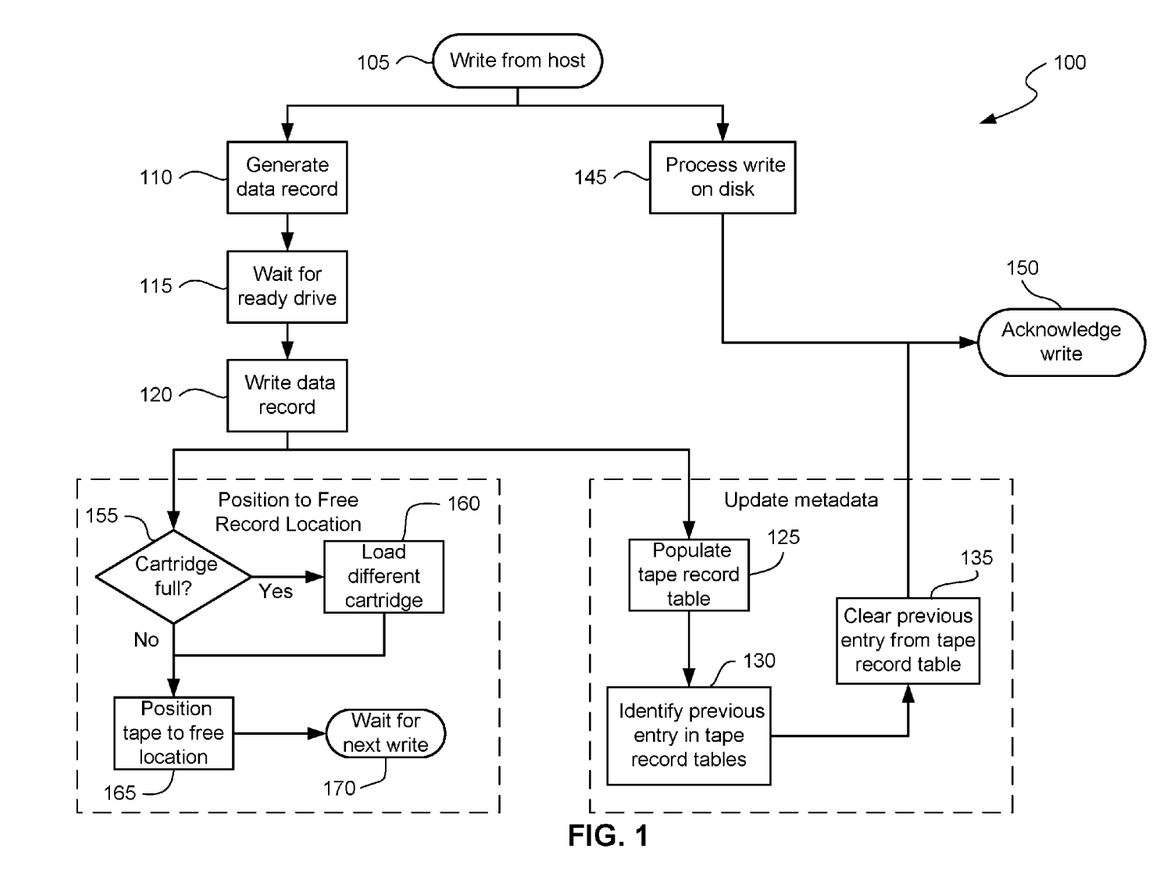
FIG. 1 depicts an example method for log-structured, synchronous tape backup in a disk storage environment.

Referring to FIG. 1, an example method 100 for log-structured, synchronous tape backup in a disk storage environment is depicted. At block 105, a write command is received at a disk storage system. In response to receiving the write command, at block 145, the write command is processed and the data is written to a first virtual disk location. Additionally, in response to receiving the write command, at block 110, a data record is generated containing the first virtual disk location, the storage location, the data, and a sequence value. At block 115, method 100 may wait for a ready tape drive which is loaded with a tape cartridge and positioned at a free record location. At block 120, the data record may be written to the free record location on the tape cartridge. In response to writing the record, method 100 may proceed to update metadata associated with the records and position a tape cartridge in the tape drive to a free record location.

At block 125, information about the data record is stored in the record metadata for the record location. For example, a tape record table may be populated with the first virtual disk location, storage location, and sequence number in a location corresponding to the location of the data record on the tape cartridge. At block 130, a location containing information corresponding to a previous data record containing backup data for the first virtual disk location is identified. This may include identifying an entry in a tape record table which contains the first virtual disk location. At block 135, the information corresponding to the previous data record is cleared, indicating that the record location is free to be written to. Once the write has been processed on disk and the metadata has been updated, method 100 proceeds to block 150 and acknowledges the write to the host.

At block 155, it is determined whether the tape cartridge is full. This may be determined by referencing metadata associated with the tape cartridge, such as a tape record table, to determine if there are more free record locations on the cartridge. If the tape cartridge is not full, method 100 proceeds to block 165. If the tape cartridge is full, method 100 proceeds to block 160, removes the tape cartridge and loads a different cartridge into the tape drive before proceeding to block 165. The cartridge loaded may be the cartridge with the most free record locations as determined through metadata, such as cartridge record bitmaps. At block 165, the loaded tape cartridge is positioned at a free record location. At block 170, the tape drive waits to write the next record.

Figure 2:
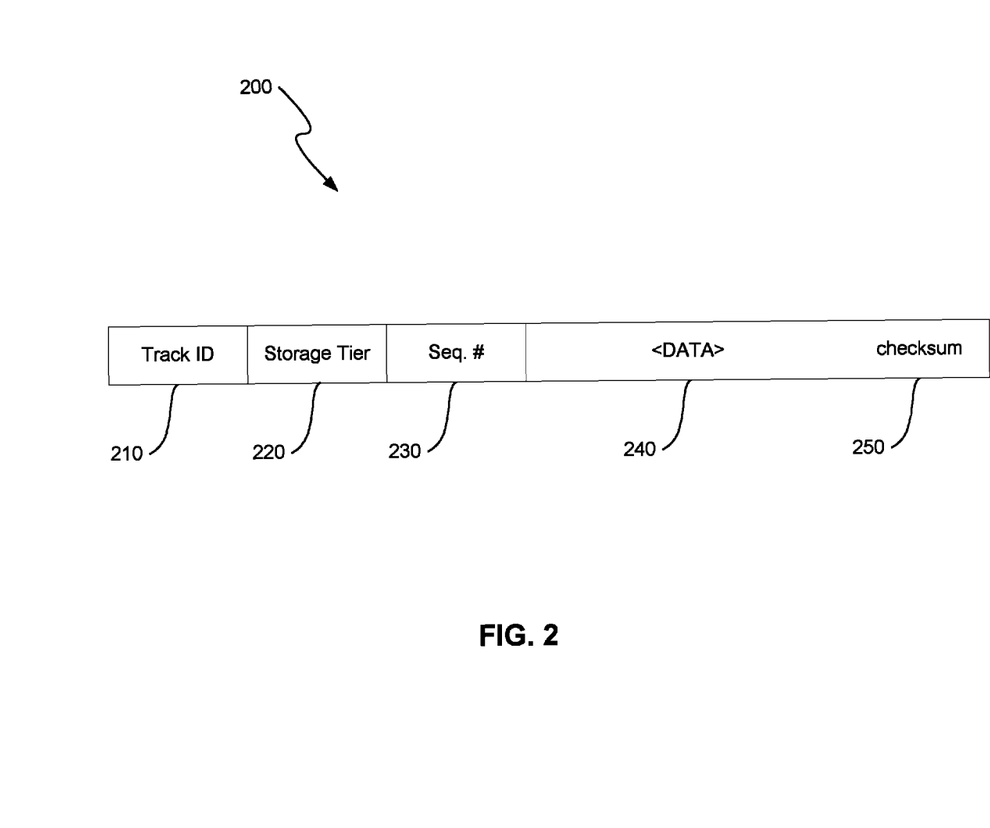
FIG. 2 depicts an example data record for writing to tape storage.

Referring to FIG. 2, an example data record 200 for writing to tape storage is depicted. Data record 200 includes a track ID 210, storage tier 220, sequence value 230, and data 240. Data record 200 may additionally contain a checksum 250 for detecting data corruption. Track ID 210 contains information indicating the virtual disk location of data 240 such as disk volume and location within the volume. Storage tier 220 indicates the storage location on which data 240 resides. Sequence value 230 indicates the relative sequence of records when compared to the sequence value of other records. Track ID 210, storage tier 220 and sequence value 230 may be located in a header of data record 200. Locating the information in a header may allow for a simpler retrieval of information during the disk restore process.

Figure 3:
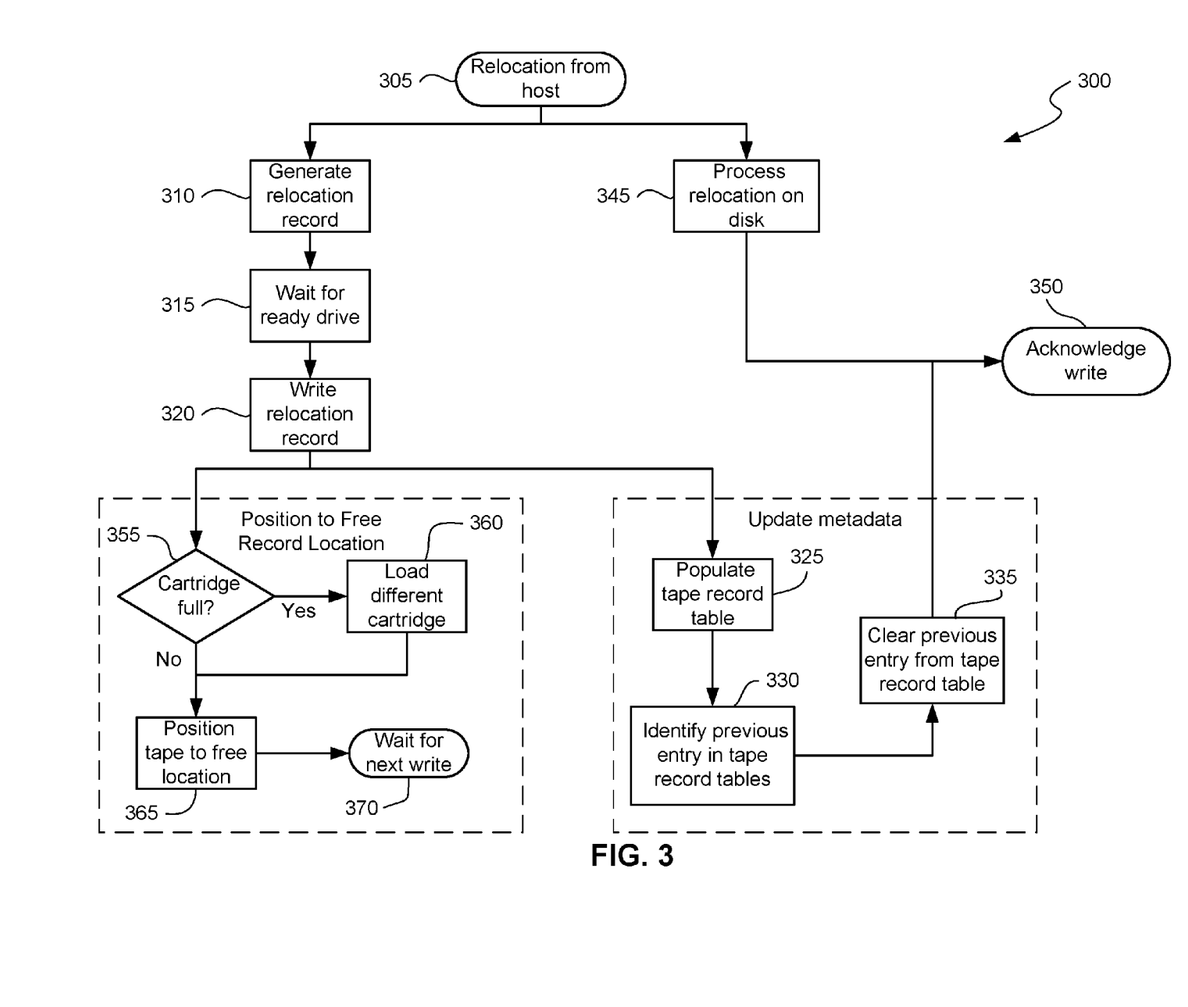
FIG. 3 depicts an example method for writing data placement records to tape backup in a log-structured, synchronous tape backup in a disk storage environment.

Referring to FIG. 3, an example method 300 for writing data placement records to tape backup in a log-structured, synchronous tape backup in a disk storage environment is depicted. At block 305, a relocation command is received at a disk storage system. In response to receiving the relocation command, at block 345, the relocation command is processed and the data is moved from a first tier to a second tier. Additionally, in response to receiving the write command, at block 310, a data placement record is generated containing the first virtual disk location, the storage location, and a sequence value. At block 315, method 300 waits for a ready tape drive which is loaded with a tape cartridge and positioned at a free record location. At block 320, the data placement record is written to the free record location on the tape cartridge. In response to writing the record, method 300 proceeds to update metadata associated with the records and position a tape cartridge in the tape drive to a free record location.

At block 325, information about the data placement record is recorded for the tape location. For example, a tape record table may be populated with the first virtual disk location, storage location, and sequence number in a location corresponding to the tape location of the data placement record. At block 330, a location containing information corresponding to a previous data placement record for the first virtual disk location is identified. This may include identifying an entry in a tape record table which contains the first virtual disk location. At block 335, the information corresponding to the previous data placement record is cleared, indicating that the record location is free to be written to. Once the write has been processed on disk and the metadata has been updated, method 300 proceeds to block 350 and acknowledges the relocation to the host.

At block 355, it is determined whether the tape cartridge is full. This may be determined by referencing metadata associated with the tape cartridge, such as a tape record table, to determine if there are more free record locations on the cartridge. If the tape cartridge is not full, method 300 proceeds to block 365. If the tape cartridge is full, method 300 proceeds to block 360, removes the tape cartridge and loads a different cartridge into the tape drive before proceeding to block 365. The cartridge loaded may be the cartridge with the most free record locations as determined through metadata, such as cartridge record bitmaps. At block 365, the loaded tape cartridge is positioned at a free record location. At block 370, the tape drive waits to write the next record.

Figure 4:
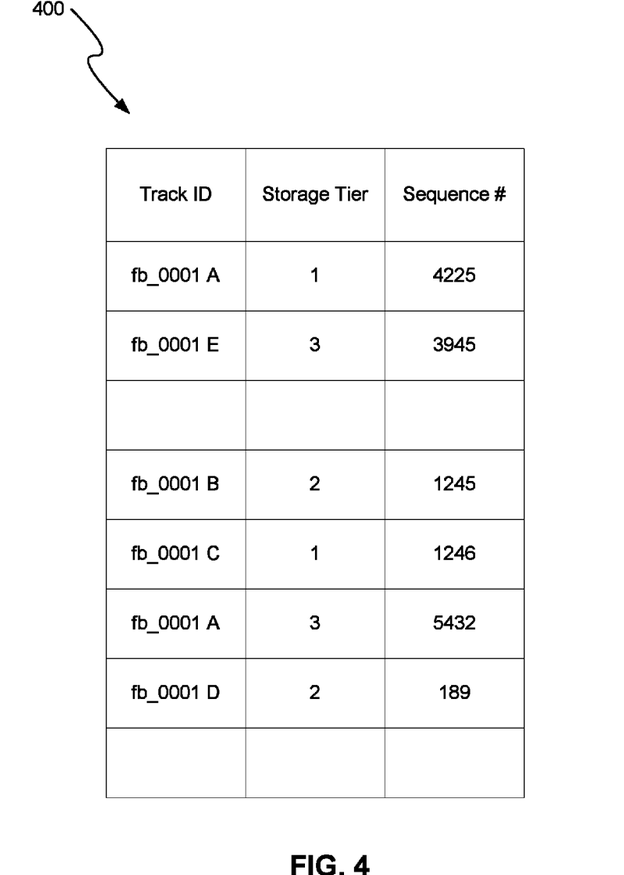
FIG. 4 depicts an example tape record table with record information for specific record locations.

Referring to FIG. 4, an example tape record table 400 with record information for specific record locations is depicted. Each row in tape record table 400 corresponds to a specific record location on a tape cartridge. A row is populated, with the track ID, storage location, and sequence number, each time a new record is written to tape with the row corresponding to the location of the record on the tape cartridge. A blank row indicates a record location which is free to be written to. The record location may not contain a record or may contain an old record which may be written over. There may be a separate tape record table for each tape cartridge in the tape backup library.

As depicted in tape record table 400, there are two entries for track ID fb_0001 A. Because entries representing an old record are cleared when a new data record is written, the entry with the higher sequence number represents a data placement record. If a new data record were written for track ID fb_0001 A, the two entries in tape record table 400 for track ID fb_0001 A would be cleared.

Figure 5:
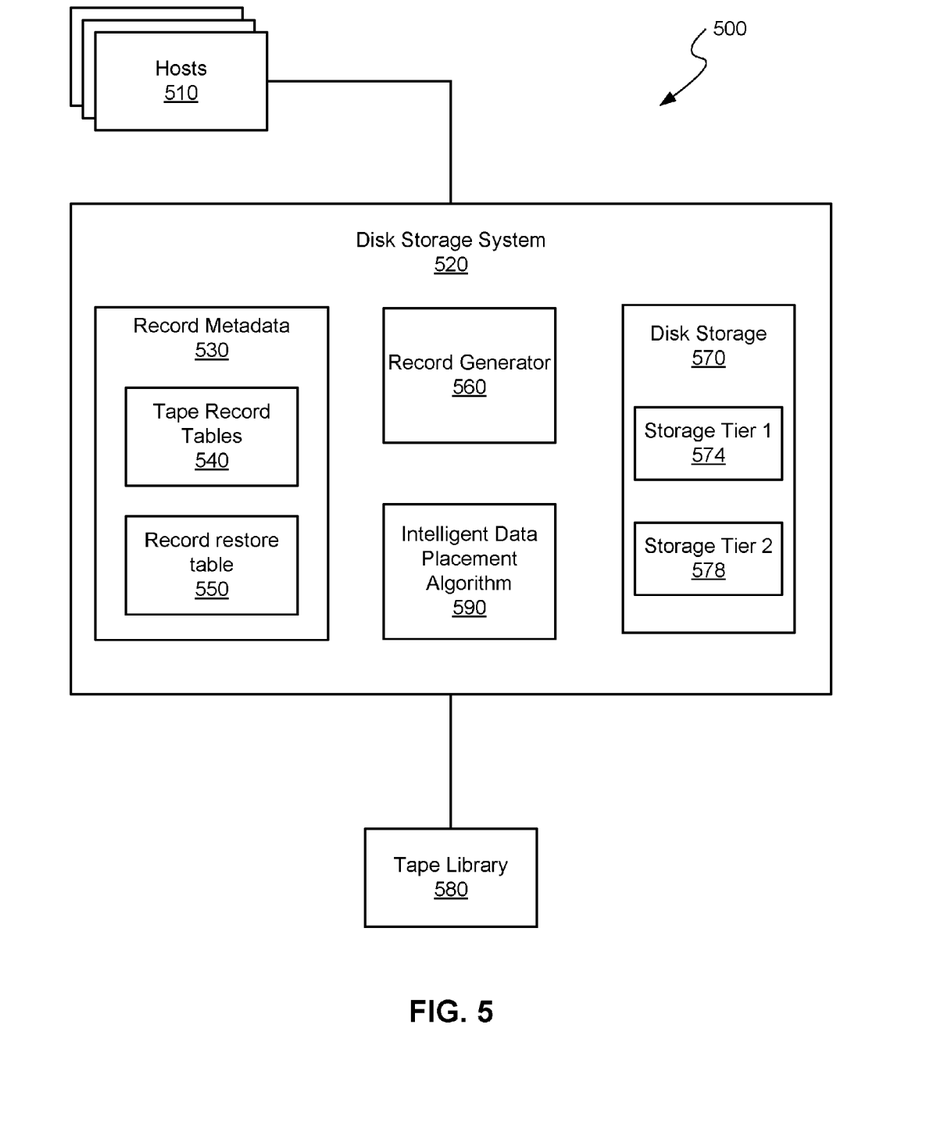
FIG. 5 depicts a block diagram of an example system for log-structured tape backup in a disk storage environment with intelligent data placement.

Referring to FIG. 5, a block diagram of an example system 500 for log-structured tape backup in a disk storage environment is depicted. System 500 includes one or more hosts 510, disk storage system 520, and tape library 580. The one or more hosts 510 may send write commands to disk storage system 520. Disk storage system 520 contains disk storage 570 on which the write commands are processed. Disk storage 570 contains storage tier 574 and storage tier 578. Disk storage system 520 further contains record generator 560 and record metadata 530. For each write of data to disk storage 570, record generator 560 may generate a data record containing the data, a virtual disk location, a storage location, and a sequence value. Disk storage system 520 contains intelligent data placement algorithm 590. Intelligent data placement algorithm 590 relocates data between storage tier 574 and storage tier 578. For each relocation of data in disk storage 570, record generator 560 generates a data placement record containing a virtual disk location, a storage location, and a sequence value.

Record metadata 530 includes tape record tables 540 and record restore table 550. Tape record tables 540 may include a tape record table for each tape cartridge in tape library 580 which contains record information for each record location on the respective tape cartridge. Tape record tables 540 may be updated after each record is written to a tape cartridge, including populating the row associated with the record location with information on the record and, for data records, clearing information from previous entries associated with the virtual disk location. Record restore table 550 may be used during the process of restoring data from tape library 580. Tape library 580 may contain one or more tape drives and one or more tape cartridges for writing records.

To initially configure a system 500 as described herein, a user may physically connect I/O ports on tape library 580 to the host adaptor I/O ports on disk storage system 520. This may be done through a switch as well. The user may configure the connection statistics for tape library 580 so that data communication can occur between disk storage system 520 and tape library 580. The user may select tape cartridges that may be used for backup purposes. The user may identify which virtual disk locations on disk storage 570 will be sequentially mirrored to tape library 580. The user may identify a set of tape drive to be used to write to the tape cartridges.

Tape record tables 540 may be configured by disk storage system 520 in response to the user identifying the pool of cartridges. Record restore table 550 may be configured by disk storage system 520 in response to the user initiating the restore process.

Due to the way in which the record writes are done sequentially to the tape cartridges, the process may proceed faster with a larger capacity in the cartridge pool. Next free record locations may be more quickly identified and more quickly available for writing a record when there is larger cartridge capacity. The cartridge capacity may be much greater than the capacity of the virtual disk locations being backed up.

Figure 6:
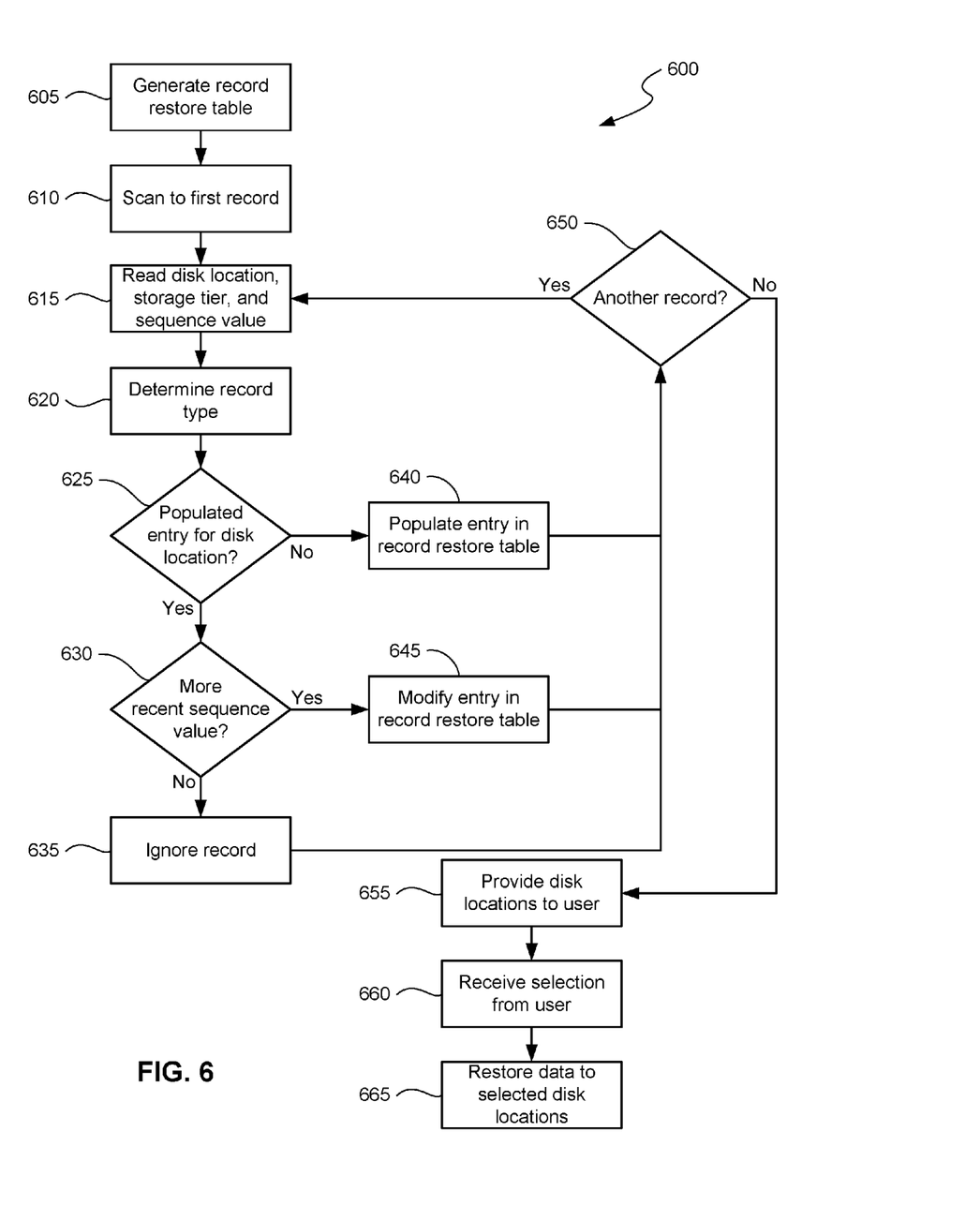
FIG. 6 depicts an example method for restoring data disk storage from tape backup.

Referring to FIG. 6, an example method 600 for restoring data disk storage from tape backup is depicted. At block 605, a record restore table is generated. This table may be generated in response to a user identifying the tape cartridges which are part of the backup cartridge pool for restoring the disk storage. At block 610, a first record is identified by scanning through tape cartridges. At block 615, the virtual disk location, storage tier, and sequence value are read from the record. These may be read from the header of the record. At block 620, the type of record is determined. This may include determining if the record contains backup data because a data record contains backup data and a data placement record does not contain backup data. At block 625, it is determined whether there is a populated entry for the virtual disk location read off the record. If there is not a populated entry, method 600 may proceed to block 640 and populate an entry in the record restore table. The entry in the record restore table may include the virtual disk location, record location of the record, and the sequence value. The entry in the record restore table may include sequence values for the data record and the storage tier. Thus, if the record is a data record, the sequence value will be populated for the data record and if the record is a data placement record, the sequence value will be populated for the storage tier. If, at block 625, there is a populated entry for the virtual disk location, method 600 proceeds to block 630.

At block 630, the sequence value from the record is compared to the sequence value in the populated entry associated with the record type. If the sequence value from the record is a more recent value, method 600 proceeds to block 645. At block 645, for a data record, the entry in the record restore table is modified to include the record location of the record and sequence value from the data record. The storage tier and associated sequence value are also updated if the sequence value of the data record is a more recent value than the sequence value associated with the storage tier. For a data relocation record, the entry in the record restore table is modified to include the storage tier and sequence value from the data relocation record.

If, at block 630, the sequence value from the record indicates an older record, method 600 proceeds to block 635 and ignores the record. From blocks 635, 640, and 645, method 600 proceeds to block 650 and scans for another record. If there is another record, method 600 returns to block 615. If there is not another record, method 600 proceeds to block 655 and provides a list of volumes that may be restored to a user. At block 660, a selection of volumes to restore is received from the user. At block 665, the selected volumes are restored to disk using the locations identified in the record restore table to read the data from the tape cartridges and write them to the most recent storage tiers.

Figure 7:
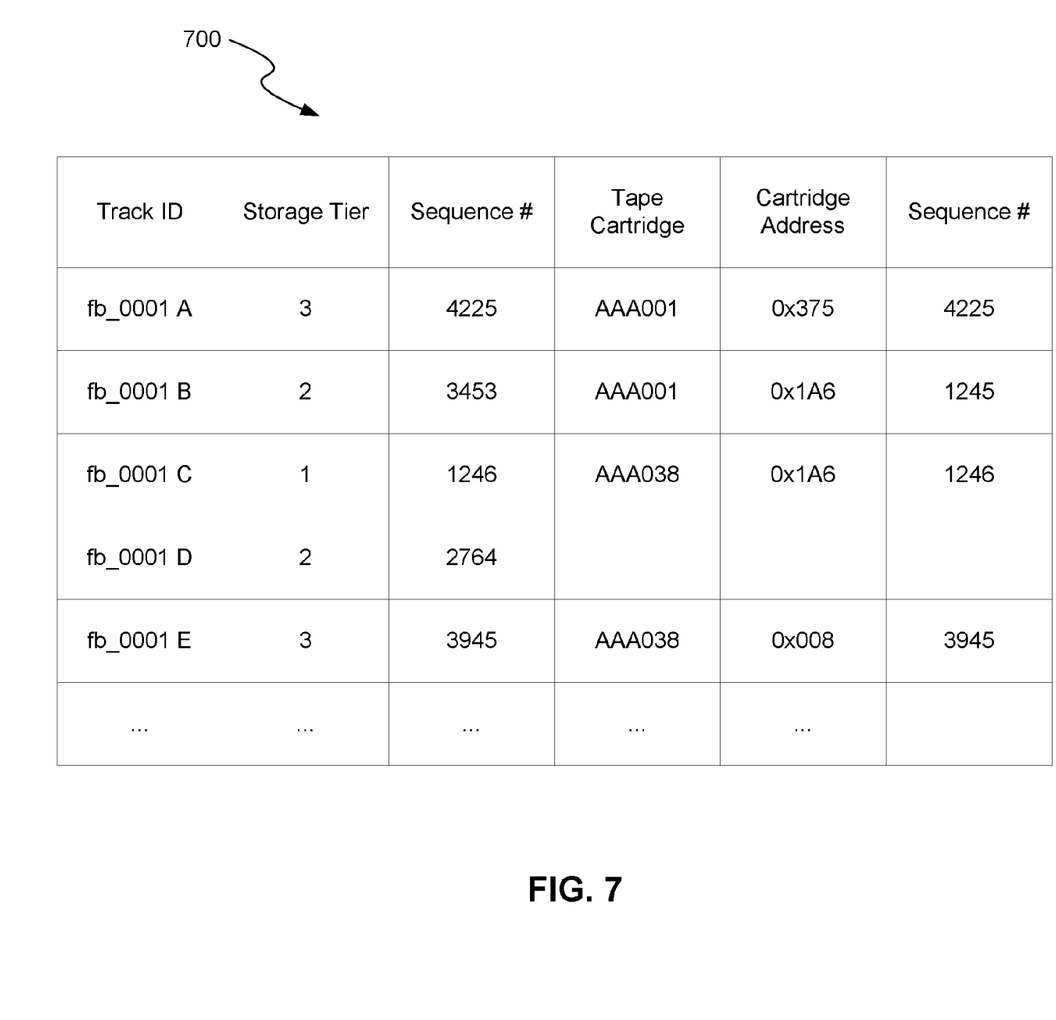
FIG. 7 depicts an example record restore table.

Referring to FIG. 7, an example record restore table 700 is depicted. As shown, each entry may include a virtual disk location (i.e. track ID), a storage tier, a sequence number associated with the storage tier, a record location (tape cartridge and cartridge address), and a sequence number associated with the data record. Table 700 may be populated as described above. As depicted, the entry for track ID fb_0001 B has a greater sequence number for the storage tier than the data record. This indicates that there was a data placement record for this track ID. Additionally, the entry for track ID fb_0001 D does not contain information on the record location or a data record sequence number. This indicates that at least one data placement record has been read for the track ID, but no data record has been read for the track ID.

For example, a header may be read from a record which contains track ID fb_0001 F. Table 700 does not have an entry for the track ID so, in this example, another row may be populated for the new track ID. For a data record, this would include all of the columns in table 700, such as depicted for track ID fb_0001 A. For a data relocation record, this would include the track ID, storage tier, and the sequence number associated with the storage tier, such as depicted for track ID fb_0001 D.

In another example, a header may be read from a data record with a track ID fb_001 E. Table 700 already has an entry for that track ID so the sequence number of the data record may determine if the information in the table is updated. In this example, if the sequence number in the header for the data record is greater than 3945, the tape cartridge, cartridge address and sequence number may be updated for track ID fb_0001 E in table 700.

In another example, a header may be read from a data placement record with track ID fb_0001 B. In this example, if the sequence number in the data placement record is greater than 3453, the storage tier and associated sequence number will be updated to reflect the information in the data placement record.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for tape backup in a disk storage environment with intelligent data placement, the computer program product comprising a computer readable storage medium having program instructions embodied therewith, the program instructions executable by a processor to perform a method comprising:
   relocating data, based on an intelligent data placement algorithm, from a first storage location to a second storage location in a disk storage system;
   generating a data placement record comprising a virtual disk location associated with the data, the second storage location, and a first sequence value, the first sequence value indicating relative sequence when compared to other sequence values; and
   writing the data placement record to a first record location on a first tape cartridge loaded in a tape drive.

2. The computer program product of claim 1, wherein the method further comprises:
   modifying record metadata on the disk storage system to indicate that the first record location contains the data placement record.

3. The computer program product of claim 2, wherein the method further comprises:
   identifying, from the record metadata, a second record location containing a previous data placement record associated with the virtual disk location; and
   modifying the record metadata to indicate that the second record location is free to be written to.

4. The computer program product of claim 2, wherein the method further comprises:

identifying a next free record location on the first tape cartridge using the record metadata; and positioning the first tape cartridge at the next free record location.

5. The computer program product of claim 2, wherein the method further comprises:

determining the first tape cartridge is full after the writing the data placement record;

removing the first tape cartridge from the tape drive;

loading a second tape cartridge into the tape drive;

determining a next free record location on the second tape cartridge using the record metadata; and positioning the second tape cartridge at the next free record location.

6. The computer program product of claim 5, wherein the method further comprises:

identifying the second tape cartridge as having a most free record locations out of a set of tape cartridges.

7. The computer program product of claim 2, wherein the record metadata comprises a tape record table containing information on records based on record location.

8. A computer program product for restoring data from tape backup in a disk storage system with intelligent data placement, the computer program product comprising a computer readable storage medium having program instructions embodied therewith, the program instructions executable by a processor to perform a method comprising:

generating a record restore table;

scanning a set of tape cartridges, each tape cartridge containing data records and data relocation records, each data record comprising a virtual disk location, a storage location, a sequence value, and backup data, each data relocation record comprising a virtual disk location, a storage location, and a sequence value;

reading a first virtual disk location, a first storage location, and a first sequence value from a first data record at a first record location;

populating a first entry in the record restore table, the first entry comprising the first virtual disk location, the first storage location, the first record location, and the first sequence value;

reading the first virtual disk location, a second storage location, and a second sequence value from a first data placement record;

determining the second sequence value is more recent than the first sequence value; and modifying the first entry in the record restore table to include the second storage location and the second sequence value.

9. The computer program product of claim 8, wherein the method further comprises:

reading a second virtual disk location, a third storage location, and a third sequence value from a second data placement record;

determining that no entry is populated for the second virtual disk location; and populating a second entry in the record restore table, the second entry comprising the second virtual disk location, the third storage location, and the third sequence value.

10. The computer program product of claim 8, wherein the method further comprises:

determining the record restore table is complete for the set of tape cartridges; and restoring backup data on the set of tape cartridges to disk storage using the record restore table.

11. The computer program product of claim 8, wherein the method further comprises:

determining the record restore table is complete for the set of tape cartridges;

providing a list of virtual disk locations available to be restored to a user;

receiving a selection of one or more virtual disk locations from the user; and restoring backup data from the set of tape cartridges to the one or more virtual disk locations using the record restore table.

\* \* \* \* \*